Figure 1:
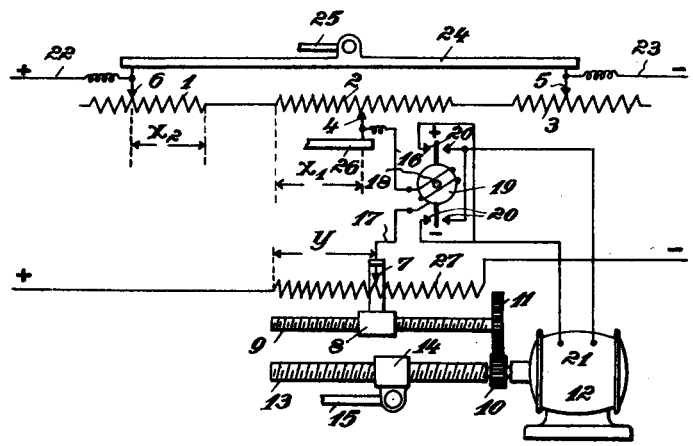

March 26, 1929.  M. SCHLEICHER ET AL  1,706,968
APPARATUS FOR THE CONTROL OF A MOVABLE MEMBER
Filed Sept. 29, 1926   3 Sheets-Sheet 1

March 26, 1929.   M. SCHLEICHER ET AL   1,706,968
APPARATUS FOR THE CONTROL OF A MOVABLE MEMBER
Filed Sept. 29, 1926    3 Sheets-Sheet 2
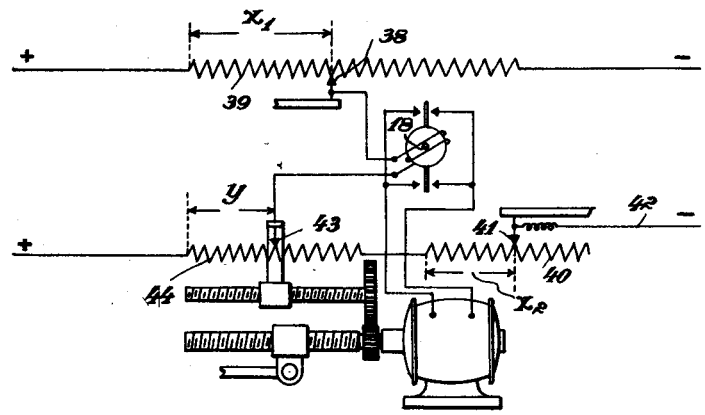
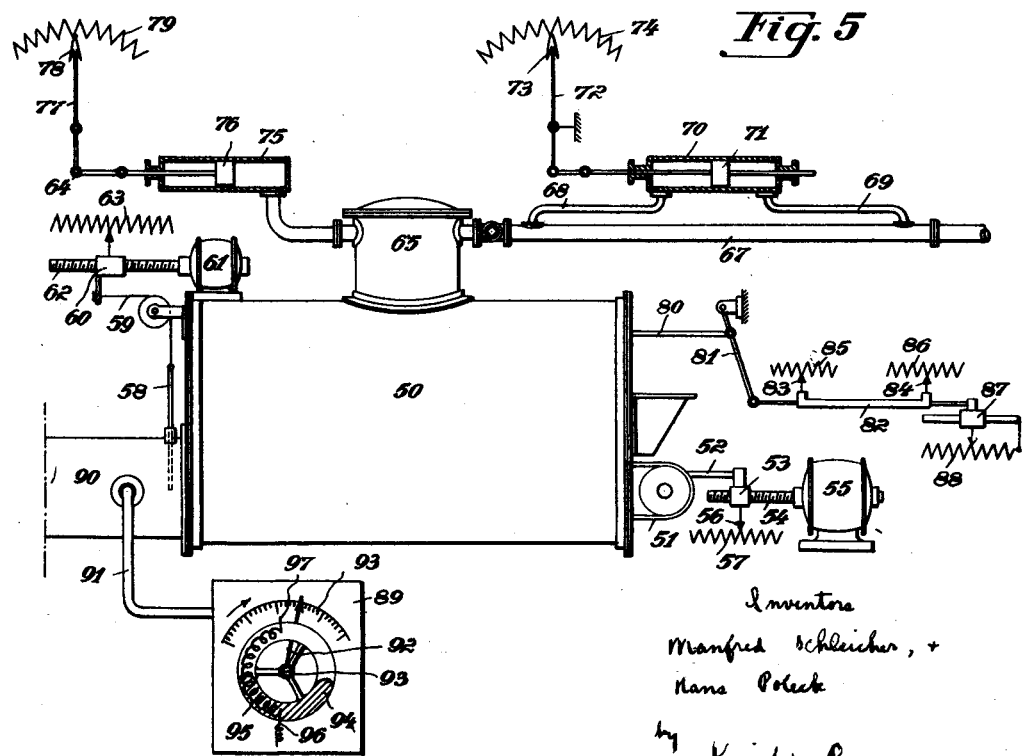

Patented Mar. 26, 1929.

1,706,968

UNITED STATES PATENT OFFICE.

MANFRED SCHLEICHER, OF BERLIN-CHARLOTTENBURG, AND HANS POLECK, OF BERLIN-LICHTERFELDE, GERMANY, ASSIGNORS TO SIEMENS & HALSKE AKTIENGESELLSCHAFT, OF SIEMENSSTADT, GERMANY, A CORPORATION OF GERMANY.

APPARATUS FOR THE CONTROL OF A MOVABLE MEMBER.

Application filed September 29, 1926, Serial No. 138,556, and in Germany December 2, 1925.

Our invention relates to improvements in apparatus for the control of a movable member by means of a transmitting device in conjunction with a Wheatstone bridge connection. The known arrangements or systems of this kind consist of two rheostats, viz'a transmitter and receiver rheostat which are connected into a Wheatstone bridge, if necessary with other resistors. In one diagonal of the bridge connection is located a source of current, in the other a galvanometer, a relay or the like. If the resistance of the transmitter rheostat is varied by the controlling member, a current appears in the diagonal in which the relay is situated which current is utilized to vary the resistance of the receiver rheostat until the relay is dead again. In this manner a definite regulating motion is produced by every variation of the transmitter rheostat, which motion not only varies the receiver rheostat, but also operates the member to be controlled.

In such an arrangement or system for the remote or telecontrol of a movable receiver member two or more controlling members are provided according to our invention which vary the magnitude of the resistance of the transmitter rheostats. In this way not only the result is obtained that the adjustment of the receiver member is made dependent upon a plurality of variable values, but that the kind of this dependence can be adapted to the practical tasks in various manners, which is of particular value for the application of the invention in practice.

We proceed now to describe the invention with reference to the embodiment illustrated in the drawings affixed hereto.

Figure 2:
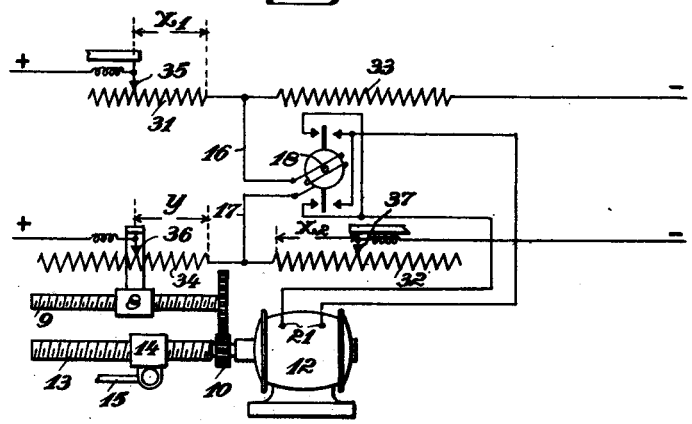
Figure 4:
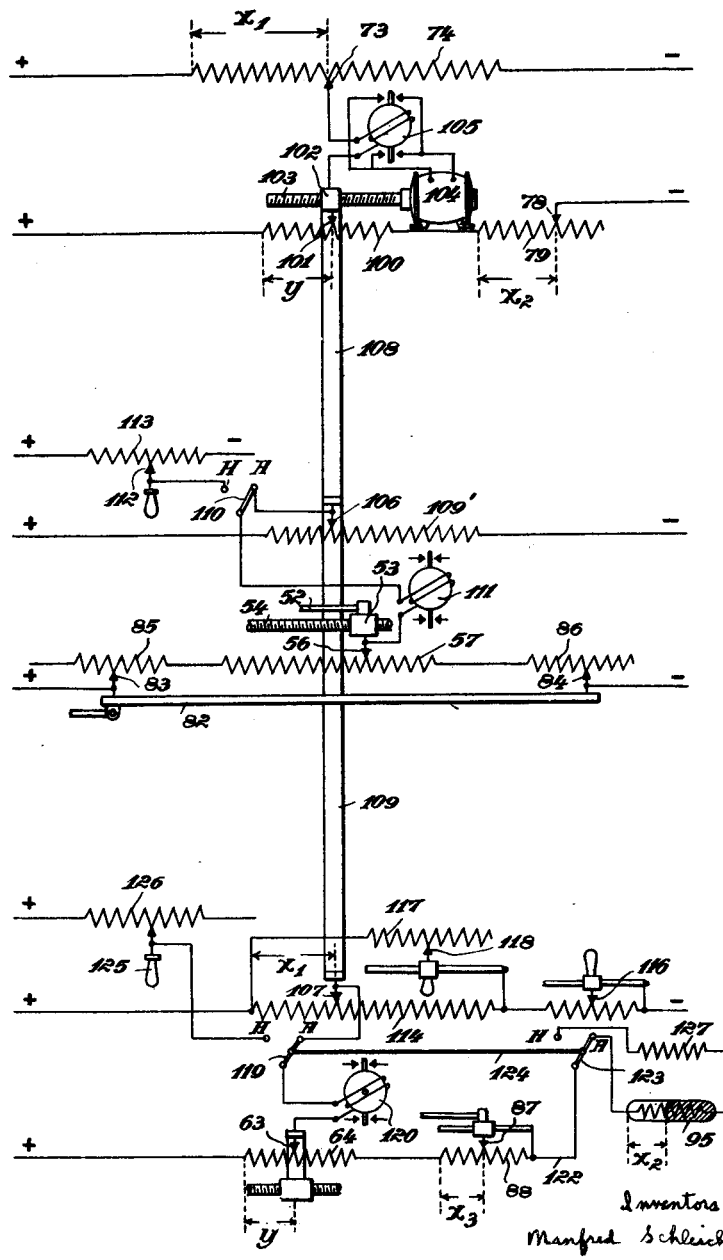

These drawings illustrate in:

Figs. 1 to 3, diagrammatic representations of individual parts of our invention, Fig. 4, a diagram of connections of our invention as applied to the regulation of a steam generator, for instance, and Fig. 5, a diagrammatic representation of the measuring and regulating devices mounted upon the steam generator.

Referring to Fig. 1 of the drawings, the transmitter rheostats are indicated by 1, 2 and 3. Upon them are slidably disposed the contacts 4, 5 and 6. The contact 6 is connected with the positive pole of a source of current by the line 22 and the contact 5 with the negative pole of that source of current by the line 23. On the receiver rheostat 27 which is connected with the poles of the already mentioned source of current is slidably disposed the contact 7. The contact is mounted upon a nut 8 adapted to travel along a screw-spindle 9. The spindle is rotated by a motor 12 through gear wheels 10, 11. With the shaft of this motor is coupled a second spindle 13 upon which a traveling nut 14 is threaded. This nut transmits its motion to the parts to be controlled by means of a connecting rod 15.

The sliding contacts 4 and 7 are electrically connected with the rotary coil 18 of a relay by means of the lines 16 and 17. The coil 18 moves in a constant magnetic field which has been omitted in the illustration for the sake of clearness. The rotating system 19 upon which the coil 18 is mounted has two contacts which, as indicated by the plus and minus sign, are permanently connected with the positive and negative pole of an auxiliary source of current not shown. The contacts + — operate in conjunction with counter contacts 20 from which lines lead to the terminals 21 of the motor 12. When the rotary system 19 deflects towards one side the current is supplied to the motor 12 in one direction and when the system deflects towards the other side the current is supplied to the motor in the opposite direction, so that the motor is correspondingly operated in one or the other direction of rotation.

The contacts 5 and 6 are mounted upon a rail 24 which by the rod 25 is connected with one of two parts of mechanism, the movements of which serve to control the receiving member 14. The contact 4 is connected with the other of the controlling parts by a rod 26. As long as the contacts 4, 5, 6 and 7 are in a certain position no current flows through the relay coil 18 and the motor 12 remains inoperative. If, however, by the displacement of the contact 4 or the contacts 5 and 6 the balance is disturbed, the coil 18 of the relay deflects towards one side and supplies the motor 12 with current in one direction or the other and the motor runs until the contact 7 upon the receiver rheostat 27 has attained that position in which the relay coil 18 becomes dead again. Since the contacts 5 and 6 are rigidly connected by the connecting rod 24 they always perform the same length of travel. The rheostats 1 and 3 upon which the contacts slide are so arranged that the contact 6 upon the rheostat 1 always cuts out as much resistance as the contact 5 upon the rheostat 3 puts into circuit and vice versa. In this way the result is obtained that the motion of the contact 7 corresponds with the sum of the motions imparted by the connecting rods 25 and 26. The path traversed by the contact 4 towards the right-hand side is indicated by $x_1$ and that traversed by the contact 6 towards the left with $x_2$ and the path traversed by the receiver contact 7 with $y$. This, as already explained, results in $y = ax_1 + bx_2$, $a$ and $b$ being constant values depending upon the dimensions of the various resistances. It is hereby assumed that the resistances 1, 2 and 27 are so arranged that each contact during traversal of an equal path upon its resistance always runs across the same amount of resistance. In many cases such an arrangement of the resistances will be preferable, but for certain cases the motion may be altered by another arrangement of the resistances.

In Fig. 2 of the drawings it is shown how the length of the path traversed by the receiver can be made equal to the product of the travels performed by the transmitter contacts. The transmitter rheostats are indicated by 31 and 32. 33 is a permanent resistor, 34 the receiver rheostat. The moving coil 18 is connected with the terminal of the rheostat 31 and resistor 33 by the line 16 and with the terminals of the rheostats 34 and 32 by the line 17. One of the transmitter contacts 35 and the receiver contact 36 are connected with the positive pole of the source of current. The free end of the resistance 33 and the second transmitter contact 37 are connected with the negative pole of the source of current. When the transmitter contact 35 traverses the path $x_1$, the transmitter contact 37 the path $x_2$ and the receiver contact the path $y$, $y$ in this connection has the value $y = c.x_1.x_2$ wherein $c$ is a constant.

In Fig. 3 of the drawing one transmitter contact 38 slides upon the transmitter rheostat 39 which is connected with the two poles of the source of current. Upon the second transmitter rheostat 40 slides the second transmitter contact 41 which is connected with the negative pole of the source of current. The receiver contact 43 slides upon the receiver rheostat 44 which is connected with the positive pole of the source of current and with the transmitter rheostat 40. The moving coil 18 of the relay is connected with the contacts 38 and 43. If $x_1$, $x_2$ and $y$ are the paths traversed by the contacts 38, 41 and 43 then we have the equation $y = d.x_1 + e.x_1.x_2$, $d$ and $e$ being constants. This system of connections is a particularly important part of our invention since it permits certain practical regulation problems to be solved.

We now proceed to describe an embodiment of our invention which serves for the regulation of a steam boiler. The parts of the steam generator coming into consideration are diagrammatically represented in Fig. 5 of the drawings. The steam generator 50 is equipped with a chain grate 51. The speed of travel of this grate may be varied in any suitable manner, not forming part of our invention, by moving a control rod 52 whereby the quantity of fuel fed into the boiler furnace is also varied. The control rod 52 is coupled with a travelling nut 53 which rides upon a threaded spindle 54 driven by a motor 55. Upon the nut 53 is mounted a contact 56 which slides upon the rheostat 57. The quantity of air supplied to the boiler furnace is regulated by a flue damper. The cable 59 from which the damper 58 is suspended is attached to a travelling nut 60 which rides upon the spindle 62 driven by the motor 61. The travelling nut also carries a contact 63 which slides along the rheostat 64.

In order to regulate automatically the supply of fuel and air to the regulator by the above described parts, measuring devices are provided, which measure the quantity of steam supplied by the generator, the pressure of the steam, the temperature at the heating surface and the carbon monoxide contents of the flue gases. Between the boiler steam dome 65 and the main steam pipe 66 is inserted a piece of tube 67 for measuring the quantity of steam. From the beginning and end of this tube pressure pipes 68 and 69 run to a differential manometer 70. The position of the piston 71 of this differential manometer corresponds with the difference of the steam pressure at the beginning and end of this piece of tube 67, and this difference is in its turn dependent of the quantity of steam flowing through the tube 67. The piston 70 displaces a contact arm 72 the contact 73 of which slides along the rheostat 74. This rheostat is thus adjusted according to the quantity of steam withdrawn from the generator. By a second manometer 75 the pressure prevailing in the boiler 50 is measured. By the piston 76 of this manometer a contact arm 77 is adjusted, the contact 78 of which slides along the rheostat 79. The rheostat 79 is thus adjusted according to the pressure of the steam.

The temperature at the heating surface may, for instance, be measured by the expansion of a steam pipe located in the flue gases. This pipe expands more and more when the temperature rises and transmits its motion upon a rod 80. This kind of temperature measuring is only stated by way of example and it will be readily understood that it may equally well be replaced by other measuring instruments or apparatus, and does not form part of our invention. The rod 80 is pivoted upon a lever 81 which transmits its motion upon a rail 82. Upon this rail are mounted the contacts 83 and 84 which slide along rheostats 85 and 86. The rail 82 is furthermore also connected with a contact 87 in such a manner that this contact is forced to take part in the movement of the rail, sliding along a rheostat 88. The rheostats 85, 86 and 88 are consequently regulated according to the temperature which prevails at a certain point in the interior of the steam boiler. To determine the condition of the flue gases a measuring apparatus 89 is provided to which is supplied a branch current of the flue gases from the flue 90 through a connecting pipe 91. The measuring apparatus 89 is provided with a pointer 92 which oscillates above a scale 93 and indicates the contents of carbon monoxide in the flue gases. Measuring apparatus of this kind is well known and does not form part of our invention. Upon the spindle 93 of the pointer 92 is mounted an annular tube 94 of glass. This tube is half filled with mercury, as indicated in the illustration. It also contains a resistance wire 95 which is led out of the tube at 96 and 97. According to the position of the pointer a greater or smaller length of the resistance wire 95 is immersed in mercury and short-circuited by it. The resistor 95 is thus regulated according to the carbon monoxide contents of the flue gases.

The manner in which the parts described with reference to Fig. 5 of the drawing are connected is clearly shown in Fig. 4. For the sake of clearness the rheostats 74, 79, 95 are shown with straight resistance wires. The rheostats as well as the contacts are in Figs. 4 and 5 indicated by like numerals of reference. The rheostat 74 along which slides the contact 73 in correspondence with the quantity of steam flowing through the main steam pipe is connected with the poles of the source of current indicated by + — signs. The contact 78 which slides upon the rheostat 79 in correspondence with the height of the steam pressure is connected with the negative pole of the source of current. One end of the rheostat 79 is connected with one receiver rheostat 100, the other end of which leads to the positive pole of the source of current. Upon the receiver rheostat 100 slides a contact 101 mounted upon a travelling nut 102. The nut rides upon a threaded spindle 103 revolved by a motor 104. The motor 104 is controlled by a relay 105 which is connected with the contacts 73 and 101. The wiring corresponds with that illustrated in Fig. 3 of the drawings. The paths of the contacts are in Fig. 4, as in Fig. 3, indicated by the letters $x_1$, $x_2$ and $y$. The path of the receiver contact 102 is thus here also $y = d.x_1 + e.x_1.x_2$. Herein $x_1$ corresponds with the quantity of steam withdrawn, $x_2$ with the pressure of the steam and $d$ and $e$ are constants. As the further specification will show the receiving member 102 controls the quantity of fuel and air supplied to the boiler furnace. Primarily these two values must be made dependent upon the quantity of steam consumed. In order that the steam generator may, however, always be maintained at the correct pressure, this pressure must also be able to have an influence upon the quantity of the fuel and air. The influence of the steam pressure must, however, be the greater the greater the quantity of steam consumed is. For this reason the regulating path ($y$) of the receiving member 102 must not be made uniformly dependent upon the quantity of steam ($x_1$) and the steam pressure ($x_2$), but besides the steam pressure the steam quantity must again appear as correction factor. That such comparatively complicated dependences can be brought about automatically by our invention itself is a particular advantage of this novel device.

With the receiving member 102 are rigidly connected the two transmitter contacts 106 and 107, as indicated diagrammatically by the connecting rods 108 and 109. The transmitter contact 106 slides along a transmitter rheostat 109' which is connected with the poles of the source of current. It is connected with one pole of the relay 111 through a change-over switch 110. The other pole of the relay leads to the contact 56 which slides upon the rheostat 57 and which, as described with reference to Fig. 5, is connected with a travelling nut 53 and a rod 52 for regulating the supply of fuel. With the ends of the receiver rheostat 57 are connected the two transmitter rheostats 85 and 86 upon which slide the contacts 83 and 84. The contacts are mounted upon a connecting rod 82 which, as illustrated in Fig. 5, is adjusted in correspondence with the temperature in the interior of the boiler 50. These contacts 83 and 84 are electrically connected with the two poles of the source of current. This part of the mechanism functions practically in the manner described with reference to Fig. 1. The only difference is that the transmitter rheostats 85 and 86 are located at both sides of the receiver rheostat 57 while according to Fig. 1 they are located at both sides of the transmitter rheostat 2. This has, however, no influence on the functions of the mechanism. The motor 55 which by means of the spindle 54 drives the contact 56 is not again shown in Fig. 4. This motor is controlled by the relay 111 in the same manner as the motor 12 from the relay 19 in Fig. 1. It moves the contact 56 so that the path traversed corresponds with the sum of the paths which are traversed by the transmitter contact 106 and the rod 82. The quantity of fuel is therefore regulated by the transmitter contact 106 in dependence from the quantity and the pressure of the steam and the fuel is by the transmitter contacts 83 and 84 also influenced by the temperature of the heating surface of the boiler.

By means of the change-over switch 110 the relay 111 may be disconnected from the transmitter contact 106 and connected with a transmitter contact 112. This contact 112 slides along a transmitter rheostat 113 which is connected with the poles of the same source of current with which the other rheostats or contacts are connected. The contact 112 is not automatically but manually adjusted. It gives the possibility to regulate the quantity of fuel for the generator by hand. The hand control position of the change-over switch 110 is indicated by the letter H, its position for automatic control by the latter A. If the change-over switch 110 is in the position H the motion of the receiver contact 56 no longer corresponds with the motion of the transmitter contact 106 but with that of the transmitter contact 112 adjusted by hand. A particularly valuable feature of this connection is that also in the position H of the change-over switch 110 the influence of the temperature of the boiler upon the quantity of fuel is not excluded. As follows from the system of connection the receiver contact 56 is compelled to perform a corresponding equalizing motion when the contacts 83 and 84 move. Even with manual operation the certainty exists that inadmissible high temperatures in the interior of the boiler cannot be developed.

With the receiver contact 101 is also connected the contact 107 which slides along the sender rheostat 114. One end of this rheostat is connected with the positive pole of the source of current and the other end runs to the rheostat 115 which is connected with the negative pole of the source of current. Upon the rheostat 115 slides a contact 116 which is adjustable by hand. Parallel to the transmitter resistance 114 is located a second rheostat 117 which can be varied by the contact 118 adjustable by hand. The transmitter contact is connected with one terminal of the relay 120 by the change-over switch 119, the other terminal leading to the contact 63 which, as shown in Fig. 5, is moved by a motor 61 simultaneously with the flue damper 58. The motor 61 is controlled by the relay 120 in the same manner as illustrated in Fig. 3 and therefore not again shown here. The contact 63 slides along the resistance 64, one end of which is connected with the positive pole of the source of current. The other end is connected with the transmitter rheostat 88 upon which slides the contact 87. This contact is across a rail 121 permanently connected with one end of the rheostat 88 so that it short circuits a smaller or greater part of this rheostat. From the rheostat 88 a line 122 leads to the change-over switch 123 and hence to the rheostat 95 which as described with reference to Fig. 5 is adapted to be short circuited to a greater or lesser extent by a column of mercury. The other end of the rheostat 95 is connected with the negative pole of the source of current. This system of connections operates substantially according to the same law as that shown in Fig. 3. A difference exists in so far as, firstly, rheostats 117 and 115 adapted to be manually operated are provided, and secondly, not only two transmitter rheostats 114 and 95 are provided, but also a third transmitter rheostat 88. From this last rheostat the position of the receiver contact 63 is dependent according to the same law as from the transmitter rheostat 95. If the resistances connected in circuit by the transmitters are denoted with $x_1$, $x_2$ and $x_3$ and the part of the receiver rheostat located at the left-hand side of the contact 63 with $y$, then we have $$y = d.x_1 + e.x_1.x_2 + f.x_1.x_3.$$

Herein $d$, $e$ and $f$ are constants which by the manually adjustable contacts 116 and 118 can be adjusted as described. $x_2$ is, as described with reference to Fig. 5, dependent upon the carbon dioxide contents of the flue gases, $x_3$ is the part of the rheostat 88 connected in circuit and dependent of the temperature in the interior of the boiler. The switches 119 and 123 are interlocked with each other by a connecting rod 124. If it is desired to regulate the volume of air automatically, both switches are brought into the position A. For manual operation the two switches are turned into the position H. The switch 119 then connects the relay with a contact 125 which may be moved along the transmitter rheostat 126 by hand and which by its position determines substantially the position of the receiver contact 63 and thus of the flue damper 58, because the switch 123 has cut out of circuit the rheostat 95 and instead of it connected in circuit a constant resistor 127 so that the carbon monoxide content of the flue gas has no further influence when the regulation is effected by hand. The rheostat 88, on the other hand, remains in the bridge connection even when the control is effected manually so that when excessively high temperatures prevail in the interior of the boiler the volume of combustion air supplied to the boiler, as in the above described manner the quantity of fuel, is reduced.

The above described embodiment of our invention shows that apparently very complicated problems of regulation may be solved by comparatively simple and reliable means.

Our invention is, however, by no means limited to the particular form of reduction to practice described above or to the regulation of steam generators, but what we claim is:

1. In a control system, in combination, electric transmitter rheostats, electric receiver rheostats, a diagonal connection between said rheostats, a source of current forming in conjunction with said rheostats and the said diagonal connection a Wheatstone bridge connection, a controlling member adapted to vary the resistance of said transmitter rheostats, automatic means for operating said controlling member, a second controlling member for varying the resistance of said transmitter rheostats, automatic means for operating said second controlling member and hand operated auxiliary means for varying the resistance of the transmitter rheostats, a controlled movable member adapted to vary the resistance of said receiver rheostat, and means controlled by the current in the diagonal branch of said bridge for moving said controlled member.

2. In a control system, in combination, electric transmitter rheostats, electric receiver rheostats, a diagonal connection between said rheostats, a source of current forming in conjunction with said rheostats and the said diagonal connection a Wheatstone bridge connection, a controlling member adapted to vary the resistance of said transmitter rheostats, two further controlling members for said transmitter so connected that the one cuts out as much resistance as the other connects in circuit, a movable controlled member adapted to vary the resistance of said receiver rheostat, and means controlled by the current flowing in the diagonal branch of the bridge for moving said controlled member.

3. In a control system, in combination, electric transmitter rheostats, electric receiver rheostats, a diagonal connection between said rheostats, a source of current forming in conjunction with said rheostats and the said diagonal connection a Wheatstone bridge connection, a controlling member adapted to vary the resistance of said transmitter rheostat, two further controlling members for said transmitter so connected and so arranged that the one connects as much resistance in circuit at the one side of said receiver rheostat as the other cuts out at the other side or said receiver rheostat, a movable controlled member adapted to vary the resistance of said receiver rheostat, and means controlled by the current flowing in the diagonal branch of the bridge for moving the said controlled member.

4. In a control system, in combination, a source of current, an electric transmitter rheostat connected with the poles of said source of current, a controlling member adapted to vary the value of said transmitter rheostats, an additional transmitter rheostat one end of which is connected with one pole of said source of current, a second controlling member adapted to vary the value of the said additional transmitter rheostat, a receiver rheostat electrically connected at one end with the other end of said further transmitter rheostat and at the other end with said source of current, an electric connection between a point of the first of said transmitter rheostats and a point of the said receiver rheostat, a relay in the said electric connection, a controlled member adapted to vary the value of the said receiver rheostats, and means for operating the said controlled member and adapted to be controlled by the said relay.

5. In a control system, in combination, a source of current, an electric transmitter rheostat connected with the poles of said source of current, a controlling member adapted to make contact with any point of the said transmitter rheostat, an additional transmitter rheostat one end of which is connected with one pole of said source of current, a second controlling member adapted to vary the value of the said additional transmitter rheostat, a permanent receiver rheostat electrically connected with the other end of said additional transmitter rheostat, a controlled member adapted to make contact with any point of said receiver rheostat, an electric connection between the first of said controlling members and the said controlled member, a relay inserted in the said electric connection, and means controlled by said relay for operating the said controlled member.

6. In a control system, in combination, electric transmitter rheostats, electric receiver rheostats, a diagonal connection between the said rheostats, a source of current which together with the said rheostats and the said diagonal connection forms a Wheatstone bridge system, a controlling member adapted to vary the value of said transmitter rheostats, an additional transmitter rheostat connected in parallel relation to said transmitter rheostats, a second controlling member adapted to vary the resistance value of said parallel connected additional transmitter rheostat, a controlled member adapted to vary the value of the said receiver rheostats, and means controlled by the current in said diagonal connection of said bridge and adapted to operate the said controlled member.

7. In a control system, in combination, electric transmitter rheostats, electric receiver rheostats, a diagonal connection between the said rheostats, a source of current which together with the said rheostats and the said diagonal connection forms a Wheatstone bridge connection, a controlling member adapted to vary the value of said transmitter rheostats, a controlled member adapted to vary the resistance value of said receiver rheostats, means controlled by the current flowing in the diagonal branch of said bridge and adapted to operate the said controlled member, a second Wheatstone bridge connection comprising a receiver rheostat, and a second controlled member adapted to vary the said receiver rheostat of the said second Wheatstone bridge connection and said second controlled member being mechanically connected with the said controlling member of the first Wheatstone bridge.

8. In a control system, a system of resistances and a pair of diagonal conductors, one of which includes a source of current, all connected together to form a Wheatstone bridge, a controlled member having a contact adjustable along one of said resistances by movement of said controlled member and serving as the connection between one end of one of said diagonals and said system of resistances, a plurality of controlling members each having one or more contacts adjustable along other resistances of said system by movement of said controlling members to vary said other resistances, and current responsive means in the diagonal conductor not including said source of current for determining the proper adjustment of said controlled member contact to eliminate a flow of current in said last mentioned diagonal.

9. A control system according to claim 8 in which the means for determining the proper adjustment of said controlled member contact comprises a reversible relay connected in the diagonal conductor not containing the source of current, a reversible motor controlled by said relay, and transmission gearing between said motor and said controlled member.

In testimony whereof we affix our signatures.

MANFRED SCHLEICHER.
HANS POLECK.